(12) United States Patent
Shaw

(10) Patent No.: US 9,961,137 B2
(45) Date of Patent: May 1, 2018

(54) LONG TERM EVOLUTION RADIO NETWORK APPLICATION-LEVEL LOAD BALANCING

(75) Inventor: Venson M. Shaw, Kirkland, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 602 days.

(21) Appl. No.: 13/457,105

(22) Filed: Apr. 26, 2012

(65) Prior Publication Data

US 2013/0290537 A1    Oct. 31, 2013

(51) Int. Cl.
*H04L 29/08* (2006.01)
*H04W 28/08* (2009.01)

(52) U.S. Cl.
CPC .......... *H04L 67/101* (2013.01); *H04W 28/08* (2013.01)

(58) Field of Classification Search
CPC ... H04L 67/1002; H04L 49/50; H04L 45/125; H04L 43/0852; H04L 67/101; H04W 28/08
USPC .......................................... 370/237; 709/226
See application file for complete search history.

(56) References Cited

U.S. PATENT DOCUMENTS

| | | | |
|---|---|---|---|
| 6,097,701 A * | 8/2000 | Grunenfelder et al. ...... 370/235 |
| 7,453,844 B1 * | 11/2008 | Lee .................. H04W 72/08 | 370/329 |
| 8,259,585 B1 * | 9/2012 | S P et al. .................. 370/237 |
| 8,620,999 B1 * | 12/2013 | L'Heureux ............. H04L 67/10 | 709/203 |
| 2005/0102675 A1 * | 5/2005 | Parkyn .................... G06F 9/485 | 718/102 |
| 2009/0037361 A1 * | 2/2009 | Prathaban .......... G06F 17/3089 | 706/47 |
| 2009/0150565 A1 * | 6/2009 | Grossner ................. G06F 9/468 | 709/241 |
| 2010/0014426 A1 | 1/2010 | Cavalli et al. |
| 2010/0058451 A1 * | 3/2010 | Paramasivam et al. .......... 726/7 |
| 2010/0173667 A1 * | 7/2010 | Hui ....................... H04W 88/06 | 455/552.1 |
| 2011/0032149 A1 * | 2/2011 | Leabman ............... H01Q 1/246 | 342/368 |
| 2011/0116443 A1 * | 5/2011 | Yu ......................... H04L 12/413 | 370/328 |
| 2011/0141922 A1 * | 6/2011 | Kotrla ................. H04L 12/2697 | 370/252 |
| 2011/0286437 A1 * | 11/2011 | Austin .................... H04W 4/02 | 370/338 |
| 2012/0106346 A1 * | 5/2012 | Aguirre ................. H04W 28/08 | 370/237 |
| 2013/0021962 A1 * | 1/2013 | Hu ........................ H04W 48/20 | 370/315 |
| 2013/0031575 A1 * | 1/2013 | Gallant et al. .................. 725/20 |
| 2013/0279334 A1 * | 10/2013 | Xu ........................ H04W 24/04 | 370/235 |
| 2013/0301441 A1 * | 11/2013 | Russell ................. H04W 24/06 | 370/252 |

(Continued)

FOREIGN PATENT DOCUMENTS

WO    WO 2012/007988 A1 *    1/2012

*Primary Examiner* — Kevin Bates
*Assistant Examiner* — Chen-Liang Huang
(74) *Attorney, Agent, or Firm* — Baker & Hostetler LLP

(57) ABSTRACT

A network device may receive an application level load balancing factor, and instruct another network device to load balance data packets based on an analysis of the application level load balancing factor.

20 Claims, 13 Drawing Sheets

(56) References Cited

U.S. PATENT DOCUMENTS

2014/0321552 A1* 10/2014 He .................. H04N 19/00909
                                                    375/240.16
2017/0180560 A1*  6/2017 Tucker ................. H04M 7/122

* cited by examiner

LONG TERM EVOLUTION RADIO NETWORK APPLICATION-LEVEL LOAD BALANCING

TECHNICAL FIELD

The technical field generally relates to wireless communications and more specifically relates to intelligent load balancing.

BACKGROUND

The current long term evolution (LTE) radio access network (RAN) delivers traffic via layer 2 resource blocks. As a result, outbound internet protocol (IP) traffic from a wireless transmit/receive unit (WTRU) and inbound traffic from the core network transforms from Layer 3 IP to Layer 2 resource blocks in order to deliver data via the radio network. Generally, X2 currently allows adjacent eNode Bs to exchange traffic status information to perform Layer 2 traffic distribution. A problem with current RAN congestion is that the traffic distribution can suddenly become congested during normal elevated traffic times, major events, and/or natural disasters.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

Intelligent network load balancing is described herein. In an example embodiment, a method may comprise receiving an application level load balancing factor, and instructing a first network device to load balance data packets based on an analysis of the application level load balancing factor.

In another example embodiment, a processor may be configured to receive an application level load balancing factor, and determine, based on an analysis of the application level load balancing factor, that a first network device will load balance data packets. In addition, a transmitter may be configured to send instructions to the first network device to load balance data packets based on the analysis of the application level load balancing factor.

In another example embodiment, a system may comprise a wireless transmit/receive unit (WTRU) that sends or receives data packets. In addition, a network device may be configured to determine, based on an analysis of an application level load balancing factor, whether a first network device will load balance data packets, wherein the first network device handles data packets that are ultimately sent or received by the WTRU; and instruct a first network device to load balance data packets based on the analysis of the application level load balancing factor.

BRIEF DESCRIPTION OF THE DRAWINGS

The following detailed description is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
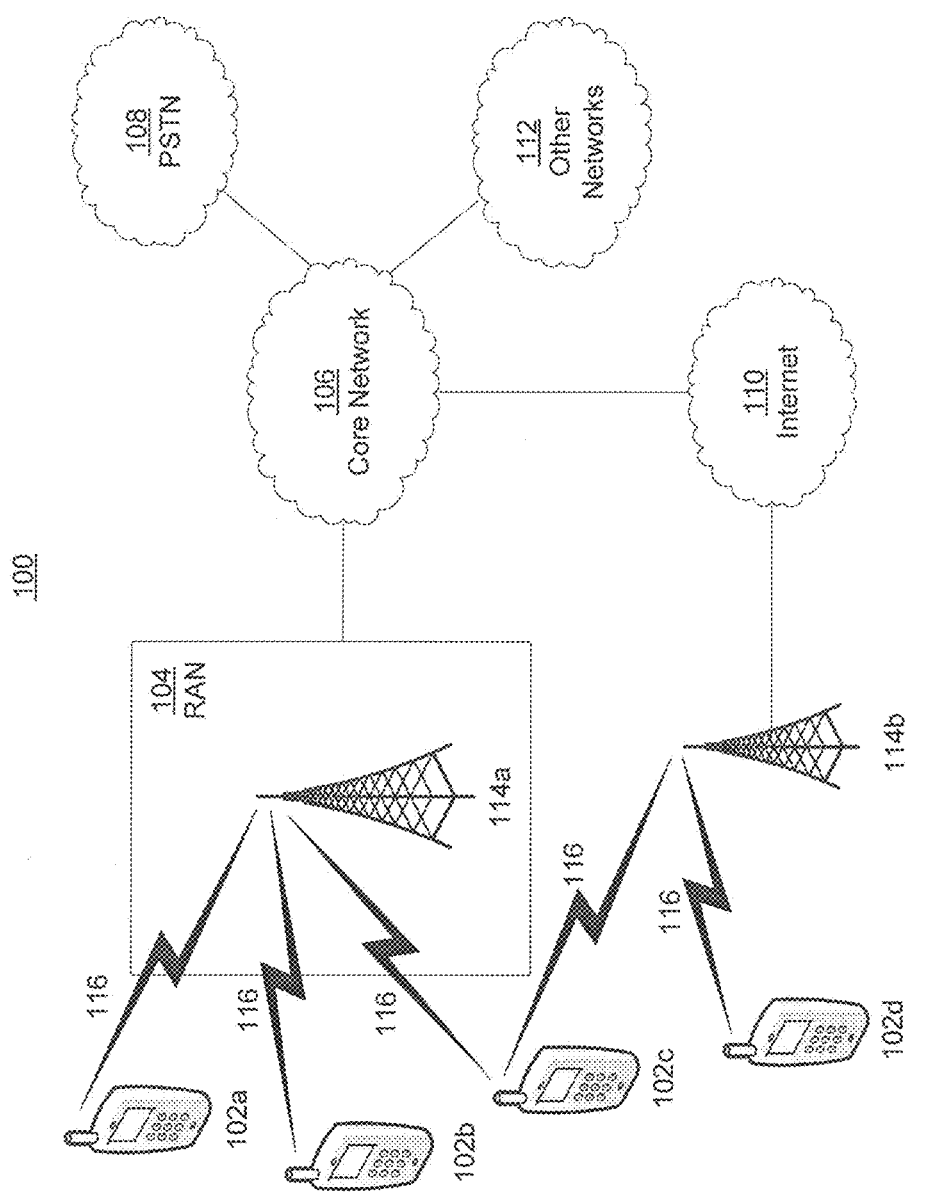
FIG. 1 is a system diagram of an example communications system in which one or more disclosed embodiments may be implemented.

FIG. 1 is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1 may also be referred to herein as a network.

As shown in FIG. 1, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1 may be configured to communicate with the base station 114a, which may employ a cellular-based radio technology, and with the base station 114b, which may employ an IEEE 802 radio technology.

Figure 2:
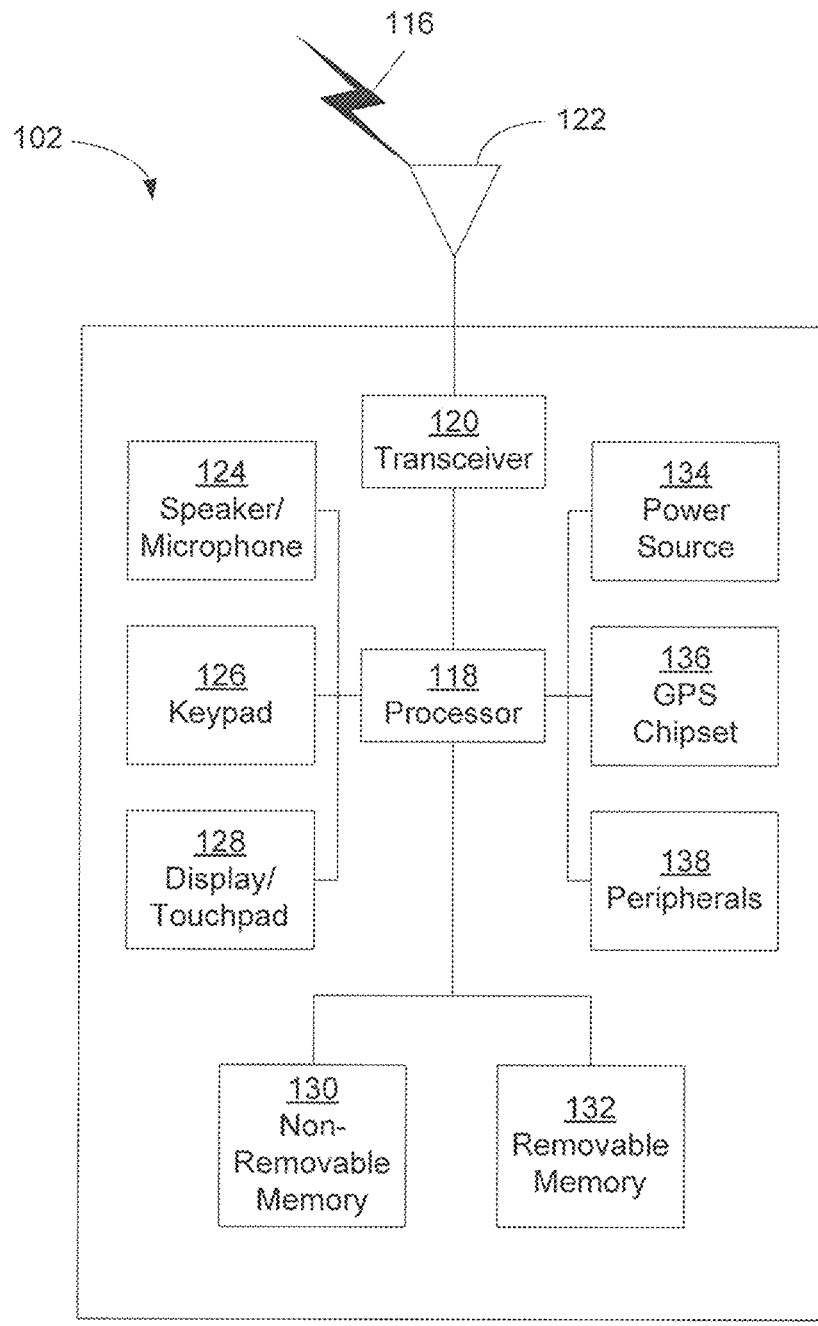
FIG. 2 is a system diagram of an example mobile device (also referred to as a wireless transmit/receive unit (WTRU) and/or as user equipment (UE)) that may be used within the communications system illustrated in FIG. 1.

FIG. 2 is a system diagram of an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 118 may include circuitry and other components that enable processor 118 to perform any of the functions and methods described herein. Such circuitry and other components may also enable processor 118 to communicate and/or interact with other devices and components, for example any other component of device of WTRU 102, in such a manner as to enable processor 118 and such other devices and/or components to perform any of the disclosed functions and methods. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3:
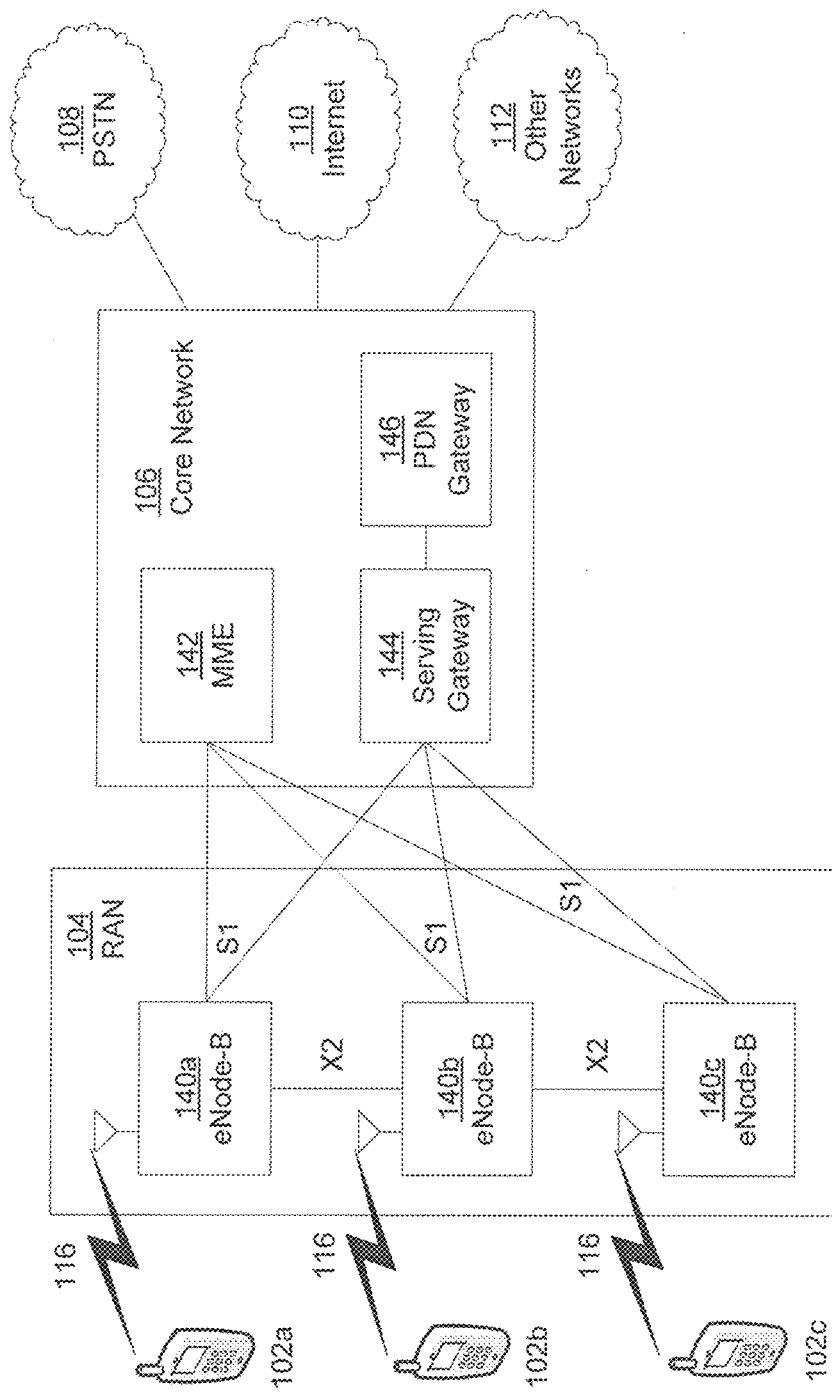
FIG. 3 is a system diagram of an example radio access network and an example core network that may be used within the communications system illustrated in FIG. 1.

FIG. 3 is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode Bs 140a, 140b, 140c, though it will be appreciated that the RAN 104 may include any number of eNode Bs while remaining consistent with an embodiment. The eNode Bs 140a, 140b, 140c may each include one or more transceivers for communicating with the WTRUs 102a, 102b, 102c over the air interface 116. In one embodiment, the eNode Bs 140a, 140b, 140c may implement MIMO technology. Thus, the eNode B 140a, for example, may use multiple antennas to transmit wireless signals to, and receive wireless signals from, the WTRU 102a.

Each of the eNode Bs 140a, 140b, and 140c may be associated with a particular cell (not shown) and may be configured to handle radio resource management decisions, handover decisions, scheduling of users in the uplink and/or downlink, and the like. As shown in FIG. 3, the eNode Bs 140a, 140b, 140c may communicate with one another over an X2 interface, which may be a logical interface. In operation, X2 interfaces may allow eNode B interconnection without relying on network elements other than transport nodes. The interconnection may in principle be direct, but it may be achieved via a transport backbone. This backbone in current networks may operate at layer 1 (L1) or layer 2 (L2) or act as a full layer 3 (L3) routed network. L1 is typically Ethernet. Other physical layers are also possible, e.g. aggregated E1/T1, (aggregated) T3, and SDH/SONET where IP may be the network layer protocol.

The core network 106 shown in FIG. 3 may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway (S-GW) during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the S1 interface, which may be a logical interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

As disclosed herein, a load balancer may be used so that traffic can be distributed efficiently across a base of eNode Bs. Traffic may be distributed based on characteristics such as an application requirement of real time performance (e.g., video), a device type, a user profile, a traffic status or condition index, or the need for more radio resources. Herein, these factors may be generally identified as application level load balancing factors.

Figure 4:
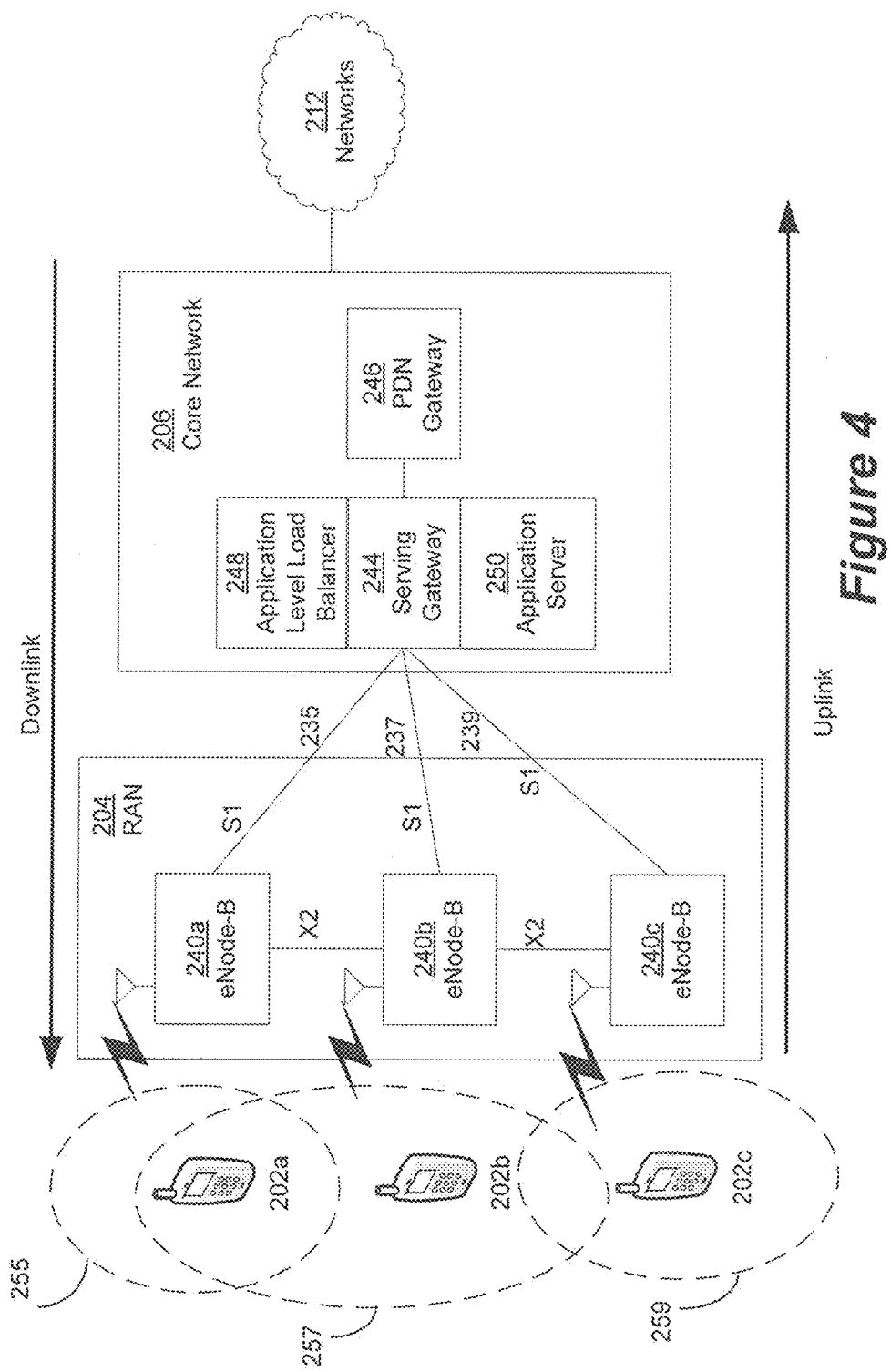
FIG. 4 illustrates a non-limiting exemplary network configuration for LTE and 3G according to one or more disclosed embodiments.

FIG. 4 is an exemplary illustration of a network implementation of an application level (e.g., layer 7 of the OSI model) load balancer for downlink (DL) traffic. In FIG. 4, an application level load balancer 248 and an application server 250 may be placed in the core network 206 for downlink traffic passing from the core network 206 to WTRU 202a, WTRU 202b, and WTRU 202c. Application level load balancer 248, serving gateway 244, and application server 250 may be integrated or separately distributed devices in whole or in part. The core network 206 may also serve as a gateway for the WTRUs 202a, 202b, and 202c to access network 212, which may include networks such as the PSTN, the Internet, and the like. The RAN 204 includes eNode Bs 240a, 240b, 240c. The eNode B 240a may be connected to the core network via S1 interface 235 and eNode B 240a may also be associated with cell 255 that includes WTRU 202a. The eNode B 240b may be connected to the core network via S1 interface 237 and eNode B 240b may also be associated with cell 257 that includes WTRU 202a and WTRU 202b. The eNode B 240c may be connected to the core network via S1 interface 239 and eNode B 240c may also be associated with cell 259 that includes WTRU 202c. Each eNB may be connected to each other via an X2 interface.

Figures 5A, 5B:
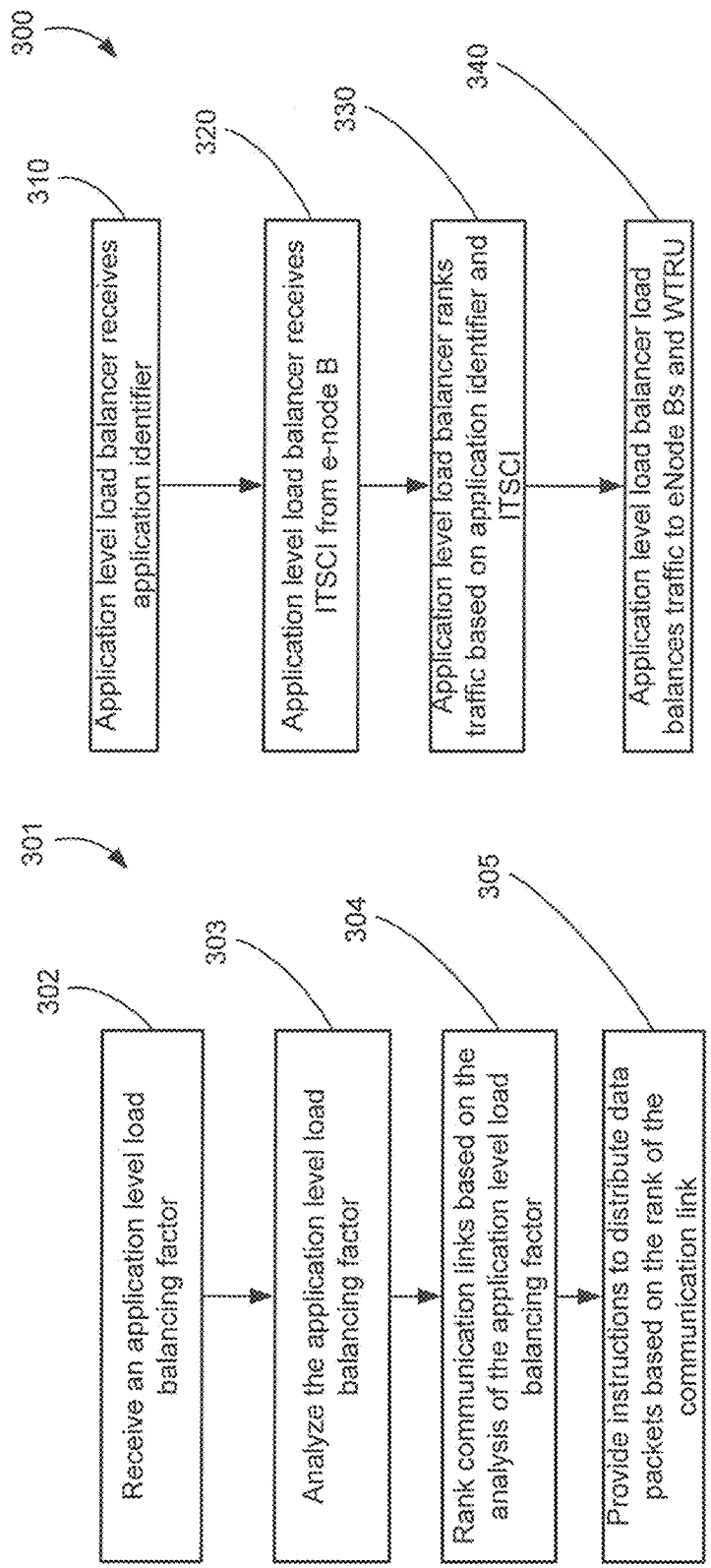
FIG. 5a illustrates a non-limiting exemplary method of implementing one or more disclosed embodiments.
FIG. 5b illustrates a non-limiting exemplary method of implementing one or more disclosed embodiments.

FIG. 5a illustrates method 301 of application level load balancing. Note that any of the functions and/or actions described in regard to any of the blocks of method 301 or other methods disclosed herein may be performed in any order, in isolation, with a subset of other functions and/or actions described in regard to any of the other blocks of method 301, and in combination with other functions and/or actions, including those described herein and those not set forth herein. All such embodiments are contemplated as within the scope of the present disclosure.

At block 302, an application level load balancing factor may be received. As stated herein an application level load balancing factor may comprise one or more components such as an application identifier, a traffic status/condition index, a user profile, or a device capability identifier. At block 303, the application level load balancing factor may be analyzed and at block 304 communication links may be ranked based on the analysis of the application level load balancing factor. The analysis may consist of ranking each component individually (e.g., ranking device capability and user profile separately) and then computing an overall rank for the communication link. At block 305, instructions may be provided to distribute data packets based on the rank of the communication link.

FIG. 5b illustrates another method of application level load balancing. At block 310, an application level load balancer may receive an application identifier from an application server. The application identifier, which may be alphanumeric, may be used as indicator for a data packet or group of related data packets (e.g., data packet flow) that indicates an application. The application identifier may be configured in a manner that best suits the network provider or other user. The application identifier may be an explicit bit placed in a data packet and recognized by the application level load balancer or it may be associated with an application element analyzed by the application level load balancer, such as identifying an application characteristic(s) of a packet or packet flow. For example, emergency text, emergency voice messages, video streaming, and non-emergency text messages may all have different application identifiers associated with them. The application identifier may also identify types of video streaming applications (e.g., Windows Media Player® versus Real Player®). The application identifiers may be prioritized in the input queue for downlink traffic according to a ranking of the real time resource requirement for each application identifier. This prioritization may be ranked from highest priority (e.g., video streaming or emergency alert applications) to lowest priority (e.g., simple text messaging).

At block 320, the application level load balancer may receive an inbound (i.e., DL) traffic status/condition index (ITSCI) from an eNode B. The ITSCI may be sent by the eNode B periodically, upon request by the application level load balancer or other device, after a significant traffic related event has occurred, or another threshold level event. The ITSCI may be based on or include information with regard to the types of traffic passing through the eNode B, such as emergency related messages, video streaming traffic, smartphone traffic, and the like. In addition, the ITSCI may be based on or include the amount of traffic currently or historically (e.g., certain dates/times) traversing the eNode B links. Historic information may be a factor in anticipating whether to send traffic over a particular eNode B when approaching a certain time window. For example, if a large and important data stream is anticipated to not finish before a historically busy time of day for an eNode B, then the traffic may be routed over another eNode B before reaching the historically busy time frame. The ITSCI also may be based on or include reliability information (e.g., slow packet times, errors, and dropped packets) of the data links (e.g., S1 interface and the air interface to the WTRU) currently and historically. Also, the ITSCI may be based on or include the reliability information of the eNode B itself, which may include processor issues, general up time of the eNode B, errors, or the like.

At block 330, the application level load balancer may rank traffic based on the application identifier and ITSCI. At block 340, the application level load balancer may instruct a S-GW to balance traffic across multiple eNode Bs based on the rank. The application level load balancer also may instruct an eNode B to balance traffic across multiple antennas of a single WTRU. For example, with reference to FIG. 4, downlink traffic may have a destination of WTRU 202a. WTRU 202a may have multiple antennas and may be within the coverage areas of eNB 240a and eNB 240b. Application level load balancer 248 may instruct S-GW 244 to load balance traffic over S1 interfaces 235 and 237. In turn, eNB 240a may send traffic to a first antenna (not shown) of WTRU 202a and eNB 240b may send traffic to a second antenna (not shown) of WTRU 202b.

In another embodiment, there may be an application level load balancer for the inbound (i.e., DL) radio network traffic based on a user profile. In an embodiment, the user profile may be configured by a network provider. For example, the application level load balancer may receive a user profile for each inbound data packet traffic flow from an application server in the core network. The user profile may comprise information such as an indicator of priority of the data packet or flow, an indicator of allowance (e.g., amount of bandwidth or download bits allowed to a device), a service permission indicator (e.g., type of service permitted for user or WTRU), a service balance of a user (e.g., how much bandwidth or download usage remains), and the like. The application level load balancer may prioritize the input queue of the downlink traffic according to a ranking of the user profile. The application level load balancer may perform load balancing so that inbound traffic from the core network, which may have a high priority or high overall user profile rank, may be distributed with a higher priority over lower priority or ranked traffic to an eNode B or WTRU.

There are multiple load balancing algorithms that may be employed by the application level load balancer and other devices described herein. Example load balancing algorithms include round robin, weighted round robin, least connections, and least response time. The functions of the application server may be located in the core network (e.g., if an Internet service provider provides the application), on the Internet, or other public or private network. The application server, for example, may be a video streaming server on the Internet that a WTRU is connected to for video streaming. The video streaming server may affirmatively tag the traffic with an application identifier that is recognizable by an application level load balancer. As discussed herein, an application level load balancer may perform load balancing so that the downlink traffic from the core network which may demand real time performance can be distributed efficiently by eNode Bs with higher priority. The application level load balancer may perform load balancing so that the inbound traffic from the core network which may demand non real time performance can be distributed across the eNode Bs with less priority. Embodiments disclosed herein may interchangeably apply to uplink or downlink traffic flows.

Figure 6:
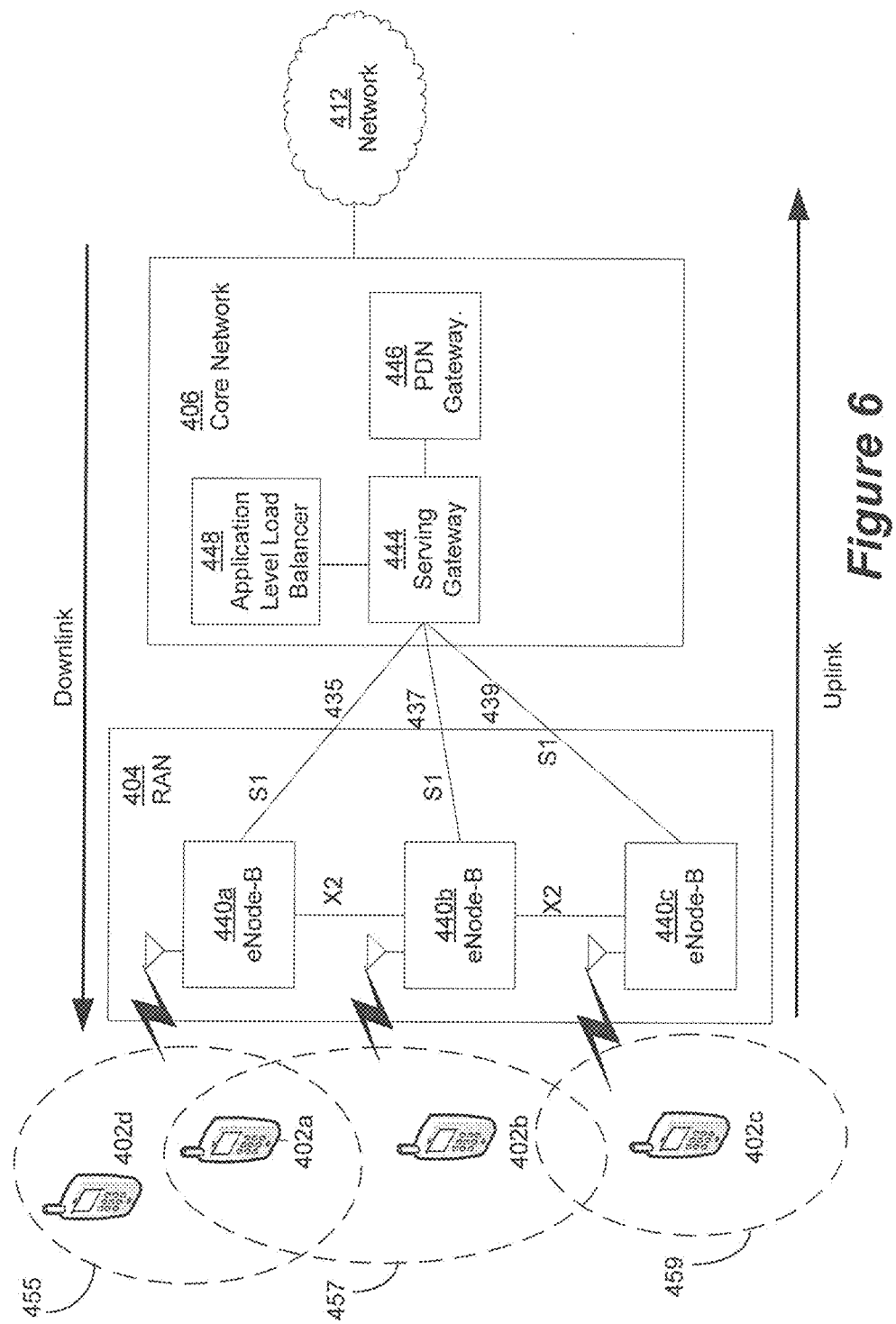
FIG. 6 illustrates a non-limiting exemplary network configuration for LTE and 3G according to one or more disclosed embodiments.

FIG. 6 is an exemplary illustration of a network implementation of an application level load balancer for uplink traffic. In FIG. 6, an application level load balancer 448 may be placed in the core network 406 for uplink traffic passing from WTRU 402a, WTRU 402b, and WTRU 402c through the eNode Bs to the core network 406 (i.e., S-GW 444). An application level load balancer may be integrated with a device (e.g., an eNode B or WTRU), it may be a separate device, or it may be distributed in whole or in part into one or more devices. The application level load balancer may be in the core network, RAN, or other connected networks.

The core network 406 may serve as a gateway for the WTRUs 402a, 402b, and 402c to access network 412, which may include networks such as the PSTN, the Internet, and the like. The RAN 404 includes eNode Bs 440a, 440b, 440c. The eNode B 440a may be connected to the core network via S1 interface 435 and also associated with cell 455 that includes WTRU 402a and WTRU 402d. The eNode B 440b may be connected to the core network via S1 interface 437 and also associated with cell 457 that includes WTRU 402a and WTRU 402b. The eNode B 440c may be connected to the core network via S1 interface 439 and also associated with cell 459 that includes WTRU 402c. Each eNB may be connected to each other via an X2 interface.

Figure 7:
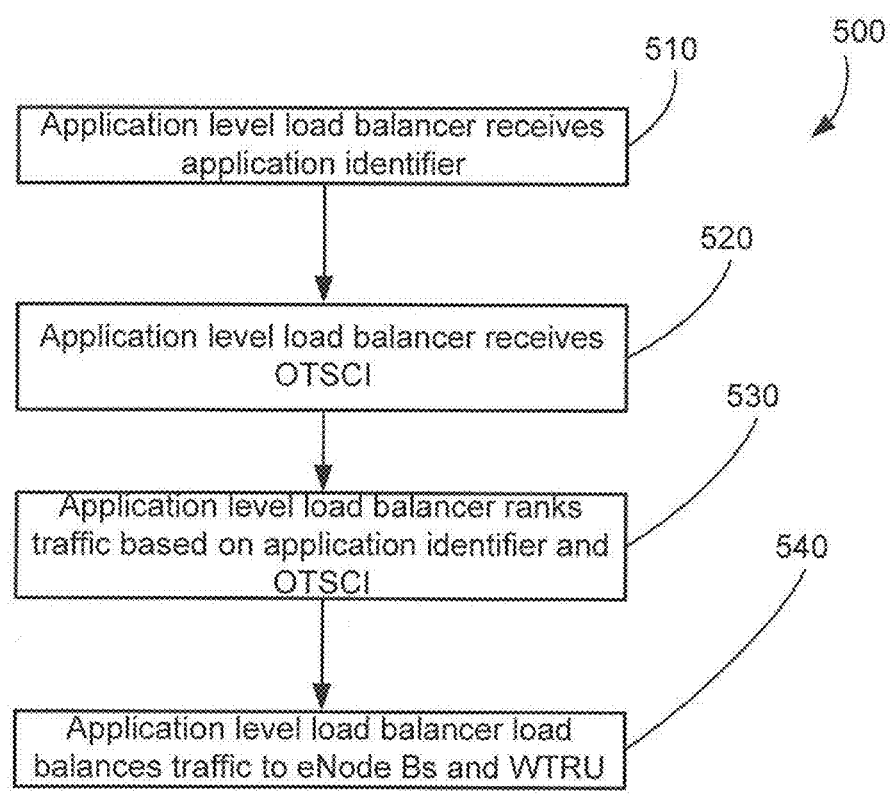
FIG. 7 illustrates a non-limiting exemplary method of implementing one or more disclosed embodiments.

FIG. 7 illustrates method 500 of application level load balancing. Note that any of the functions and/or actions described in regard to any of the blocks of method 500 may be performed in any order, in isolation, with a subset of other functions and/or actions described in regard to any of the other blocks of method 500, and in combination with other functions and/or actions, including those described herein and those not set forth herein. All such embodiments are contemplated as within the scope of the present disclosure.

At block 510, an application level load balancer may receive an application identifier. The application identifier may be used as indicator for a data packet or group of related data packets (e.g., data packet traffic flow). The application identifier may be sent by a WTRU, an eNodeB, or a separate application server, for example. The application identifiers may be prioritized in an input queue for uplink traffic according to a ranking of the real time resource requirement for each application identifier. This prioritization may be ranked from highest priority (e.g., video streaming or emergency alert applications) to lowest priority (e.g., simple text messaging).

At block 520, the application level load balancer may receive an outbound (i.e., UL) traffic status/condition index (OTSCI) from an eNode B or a WTRU in an area. The OTSCI may be sent by the e-node B or WTRU periodically, upon request by the application level load balancer or other device, or after a significant traffic related event has occurred, for example. The OTSCI may be based on or include information with regard to the types of traffic passing through the eNode B or from the WTRU, such as emergency related messages, video streaming traffic, smartphone traffic, and the like. In addition, the OTSCI may be based on or include the amount of traffic currently or historically (e.g., certain dates/times) traversing the WTRU to eNode B and the eNode B to core network links, for example. Historic information may be a factor in anticipating whether to send traffic over a particular eNode B when approaching a certain time window. For example, if a large and important data stream is anticipated to not finish before a historically busy time of day for an eNode B then the traffic may be routed over another eNode B before reaching the historically busy time frame. The OTSCI also may be based on or include reliability (e.g., slow packet times, errors, and dropped packets) of the data links (e.g., S1 interface and the air interface of the WTRU) currently and historically. The OTSCI also may be based on or include the reliability of the eNode B or WTRU itself (e.g., processor, up time, or errors).

At block 530, the application level load balancer may rank traffic based on the application identifier and OTSCI. At block 540, the application level load balancer may instruct a WTRU to balance traffic across multiple eNode Bs and multiple antennas of the WTRU. For example, with reference to FIG. 6, uplink traffic may be sent to network 412. WTRU 402a may have multiple antennas and may be within the coverage areas of eNB 440a and eNB 440b. Application load balancer 448 may instruct WTRU 402a to load balance traffic over eNB 440a and eNB 440b. In turn, eNB 440a may send traffic to the core network 406 via S1 interface 435 and eNB 440b may send traffic to the core network 406 via S1 interface 437. As stated herein, there are multiple load balancing algorithms that may be employed by the application level load balancer that can be used in a downlink or an uplink traffic situation.

In an embodiment, at block 540, the application level load balancer may direct WTRUs that are covered by multiple cells to different eNode Bs based on the application identifier or OTSCI. For example, with reference to FIG. 6, eNodeB 440a may be overloaded with traffic and initially have WTRU 402a and WTRU 402d connected to it. The application level load balancer 448 may do an analysis of the application identifier and OTSCI, and based on the analysis and a resulting ranking, for example, direct the WTRU 402a to reconnect to eNode B 440b in order to balance the load.

In an embodiment, there may be an application level load balancer for the outbound (i.e., UL) radio network traffic based on device capability. For example, the application level load balancer may receive a device capability identifier for each outbound traffic flow from a WTRU. The device capability identifier may comprise a device category (e.g., smartphone, laptop, pager, or vehicle), a device video frame rate, a device display resolution, and the like. The application level load balancer may prioritize the input queue of the uplink traffic according to a ranking of the device capability. The application level load balancer or other device may perform load balancing so that the portion of the uplink traffic from the WTRU, which may have a high overall device capability rank, may be distributed with a higher priority over lower ranked traffic to an eNode B or core network. The priority of the device may determine whether a WTRU may connect to a particular eNode B. For example, a lower priority device may be a smartphone that is relatively stationary in one area while a higher priority device may be a vehicle transceiver that is traveling at a speed that will have it quickly move out of the coverage area of the eNode B. Therefore the traffic may be distributed differently upstream.

As stated herein, the application level load balancer may be a separate device or integrated with another device. In an embodiment, the application level load balancer may be integrated with a WTRU or eNode B, which may allow the WTRU or eNode B to make near instantaneous decisions regarding distribution of traffic. In another embodiment, the application level load balancer may be a separate device that may be located on a core network. A separate application level load balancer may allow a WTRU or other device to process other functions more quickly. The application level load balancer may gather information (e.g., OTSCI, app identifier) directly from a WTRU, for example, analyze the gathered information, and periodically instruct the WTRU to balance traffic in a particular manner (e.g., video streaming to a first eNB and emergency texts to a second eNB). In yet another embodiment, there may be a primary separate application level load balancer on a core network and a secondary application level load balancer integrated in a WTRU. In a situation where there is no communication with the primary separate application level load balancer within a certain timeframe then the WTRU may implement its integrated version of the application level load balancer.

As discussed herein, an application level load balancer may instruct network devices to load balance in a particular manner based on many factors such as, an application identifier, a traffic status or condition index (inbound and outbound), a user profile, and device capability identifier. Herein, these factors may be generally identified as application level load balancing factors. Set forth below are further exemplary systems, devices, and components in which aspects of application level load balancing may be implemented.

Figure 8:
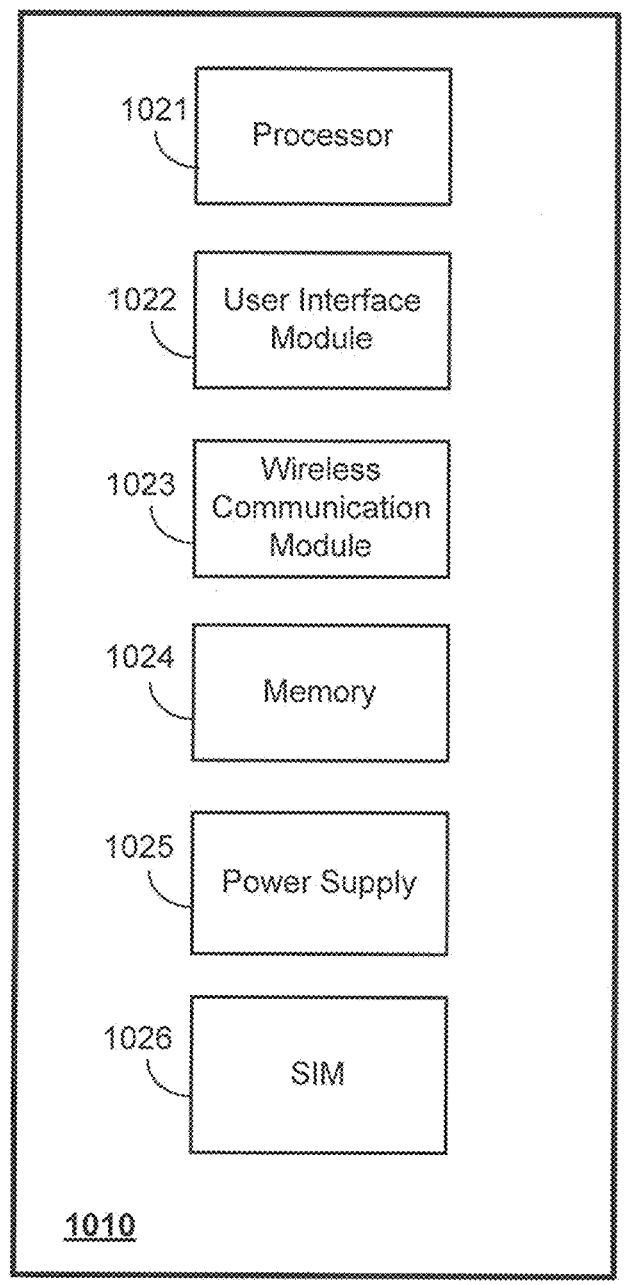
FIG. 8 is a block diagram of a non-limiting exemplary mobile device in which one or more disclosed embodiments may be implemented.

FIG. 8 illustrates an example wireless device 1010 that may be used in connection with an embodiment. References will also be made to other figures of the present disclosure as appropriate. For example, mobile devices 202a, 202b, and 202c may be wireless devices of the type described in regard to FIG. 8, and may have some, all, or none of the components and modules described in regard to FIG. 8. It will be appreciated that the components and modules of wireless device 1010 illustrated in FIG. 8 are illustrative, and that any number and type of components and/or modules may be present in wireless device 1010. In addition, the functions performed by any or all of the components and modules illustrated in FIG. 8 may be performed by any number of physical components. Thus, it is possible that in some embodiments the functionality of more than one component and/or module illustrated in FIG. 8 may be performed by any number or types of hardware and/or software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (i.e., computer readable instructions stored in a computer readable medium) that may include functionality related to application level load balancing, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 9:
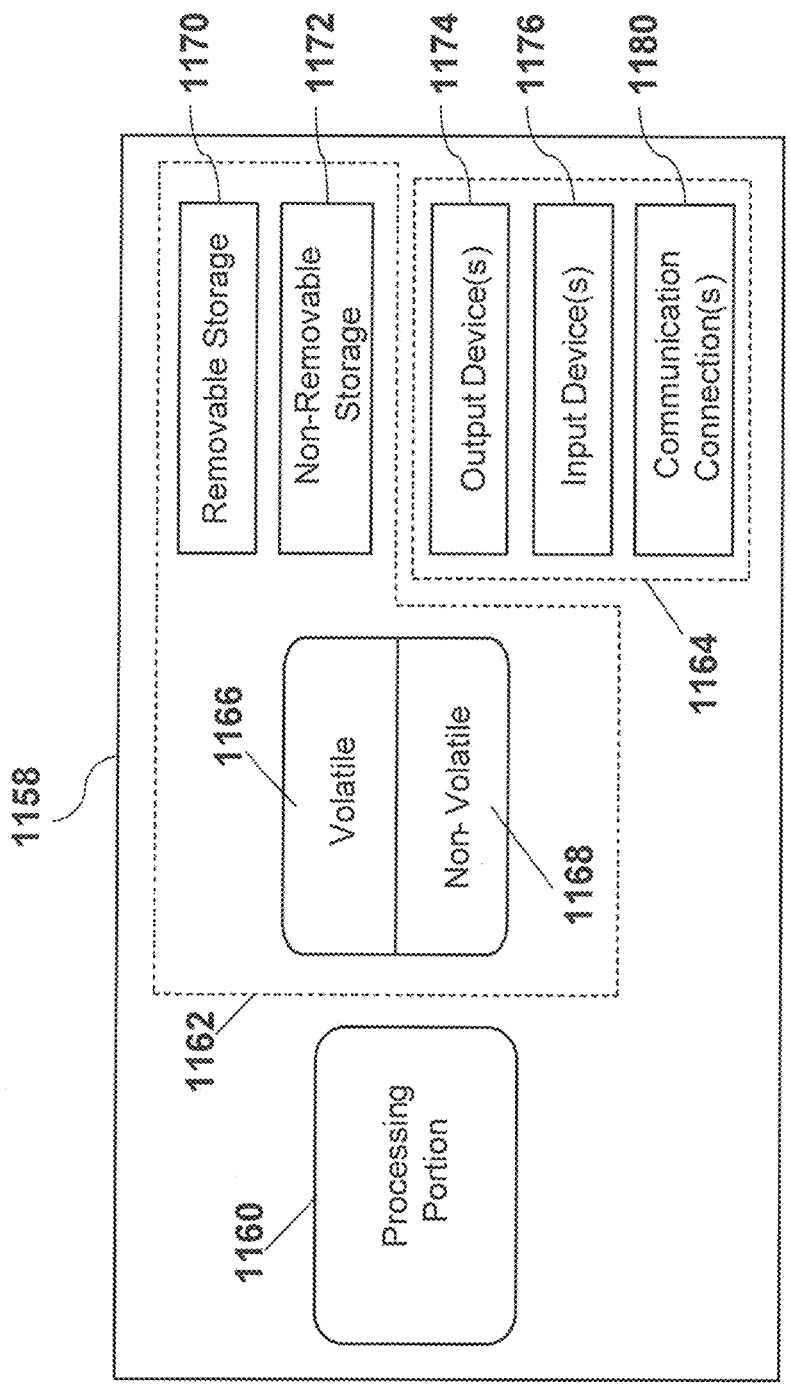
FIG. 9 is a block diagram of a non-limiting exemplary processor in which one or more disclosed embodiments may be implemented.

FIG. 9 is a block diagram of an example processor 1158 which may be employed in any of the embodiments described herein, including as one or more components of mobile devices 202a, 202b, and 202c, as one or more components of network equipment such as S-GW 244, PDN Gateway 246 any other component of networks 204 and 206, and/or any related equipment, and/or as one or more components of any third party system or subsystem that may implement any portion of the subject matter described herein. It is emphasized that the block diagram depicted in FIG. 9 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 9, the processor 1158 comprises a processing portion 1160, a memory portion 1162, and an input/output portion 1164. The processing portion 1160, memory portion 1162, and input/output portion 1164 are coupled together (coupling not shown in FIG. 9) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for an application level load balancing, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how application level load balancing may be implemented with stationary and non-stationary network structures and architectures in order to do application level load balancing. It can be appreciated, however, that application level load balancing as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, application level load balancing may be applied independently of the method of data transport and does not depend on any particular network architecture or underlying protocols.

Figure 10:
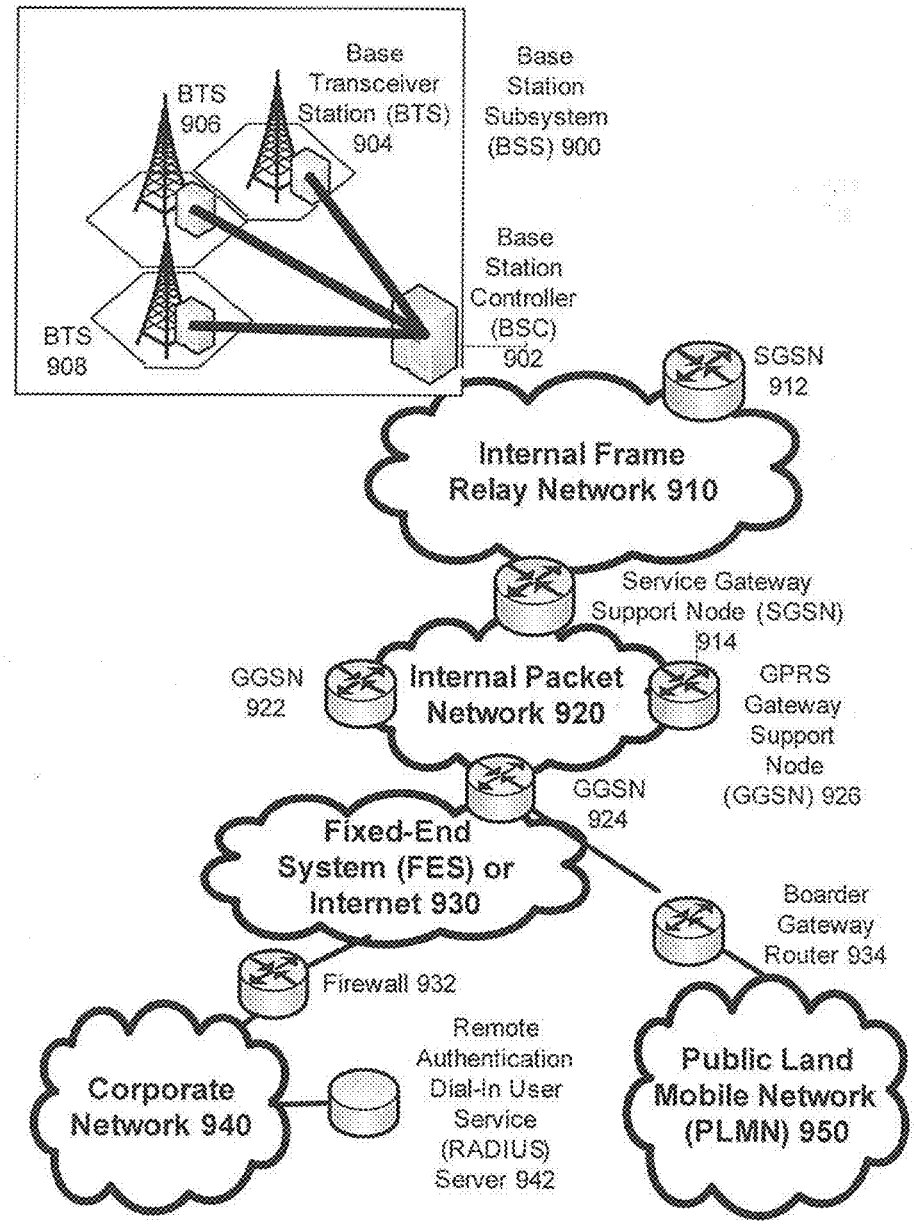
FIG. 10 is a block diagram of a non-limiting exemplary packet-based mobile cellular network environment, such as a GPRS network, in which one or more disclosed embodiments may be implemented.

FIG. 10 depicts an overall block diagram of an exemplary packet-based mobile cellular network environment, such as a GPRS network, in which application level load balancing systems and methods such as those described herein may be practiced. In an example configuration, any RAN as described herein may be encompassed by or interact with the network environment depicted in FIG. 10. Similarly, mobile devices 202a, 202b, and 202c may communicate or interact with a network environment such as that depicted in FIG. 10. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 202a, 202b, and 202c) become connected to the wireless network. In exemplary fashion, the packet traffic originating from user devices (e.g., mobile devices 202a, 202b, and 202c) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 11:
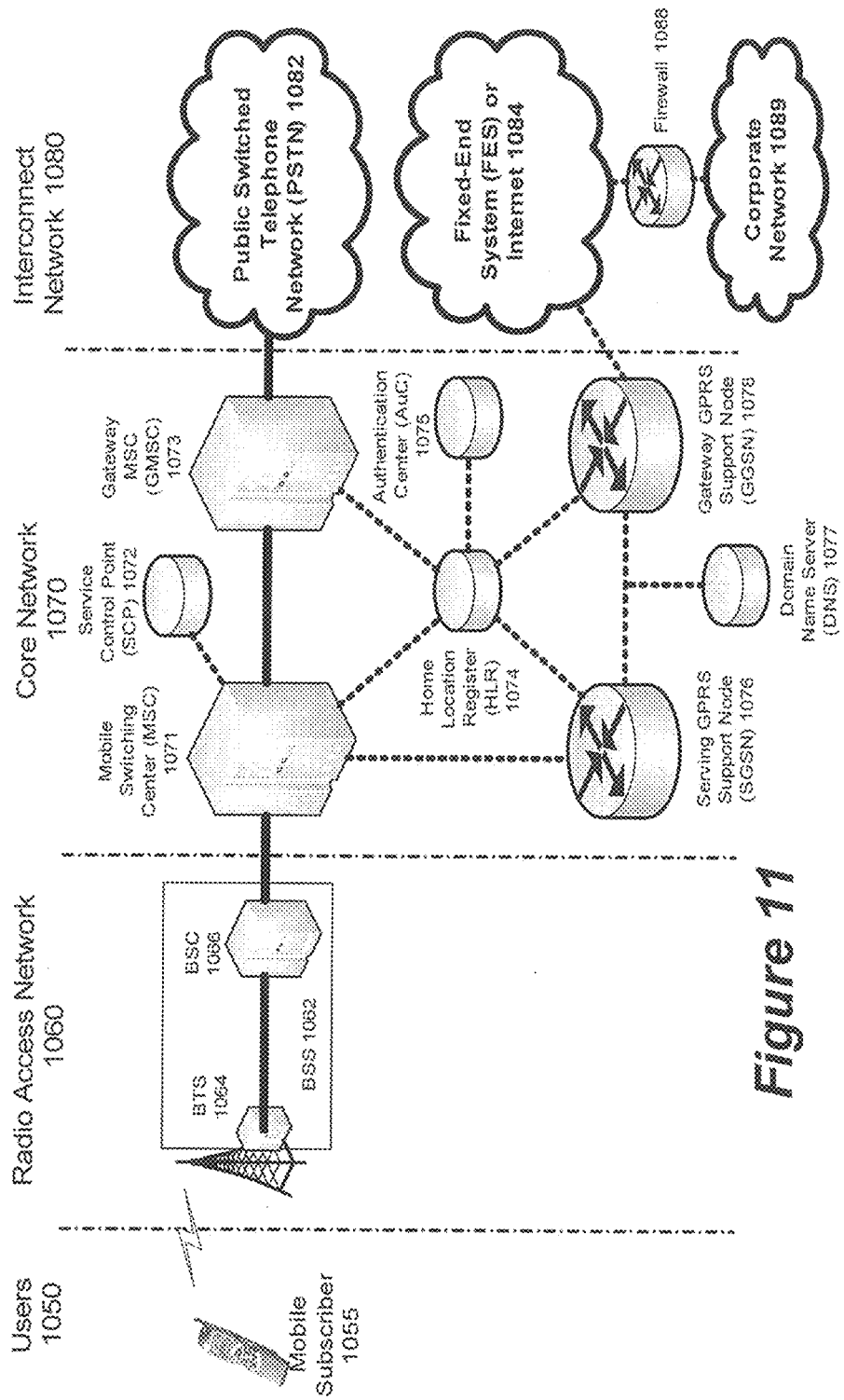
FIG. 11 illustrates a non-limiting exemplary architecture of a typical GPRS network, segmented into four groups, in which one or more disclosed embodiments may be implemented.

FIG. 11 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 11). In an example embodiment, the device depicted as mobile subscriber 1055 may comprise any of mobile devices 202a, 202b, and 202c. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 11, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 202*a*, 202*b*, and 202*c*, used by an end user of a mobile cellular service or a wireless provider. When a mobile subscriber turns on his or her mobile device, the mobile device may go through an attach process by which the mobile device attaches to an SGSN of the GPRS network. In FIG. 11, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of application level load balancing systems and methods such as those described herein may include, but are not limited to, Gateway GPRS Support Node tables, Fixed End System router tables, firewall systems, VPN tunnels, and any number of other network elements as required by the particular digital network.

Figure 12:
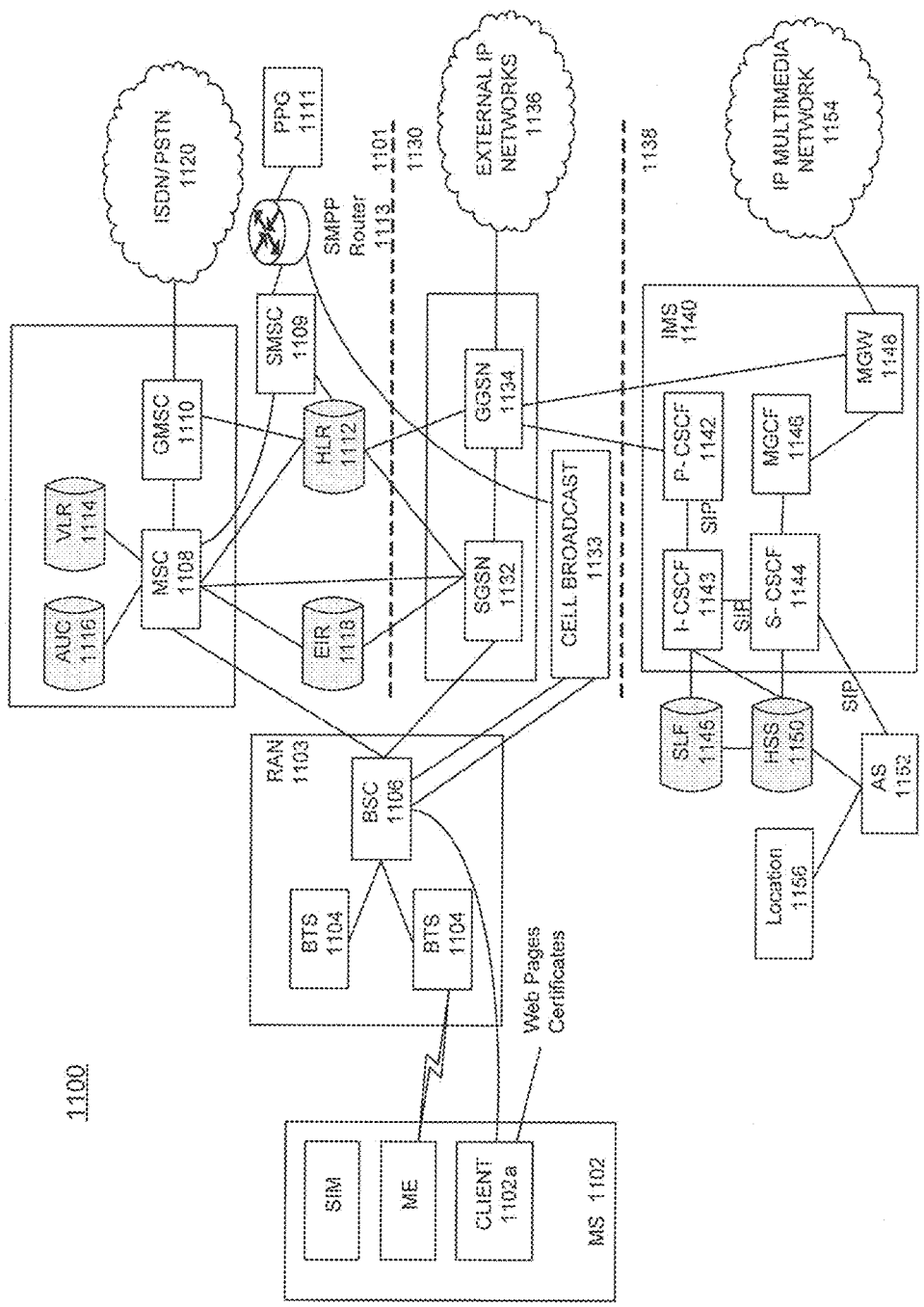
FIG. 12 illustrates a non-limiting alternate block diagram of an exemplary GSM/GPRS/IP multimedia network architecture in which one or more disclosed embodiments may be implemented.

FIG. 12 illustrates another exemplary block diagram view of a GSM/GPRS/IP multimedia network architecture 1100 in which the systems and methods for application level load balancing such as those described herein may be incorporated. As illustrated, architecture 1100 of FIG. 12 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 202*a*, 202*b*, and 202*c*) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. Examples of HSS 1150 may include HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 13:
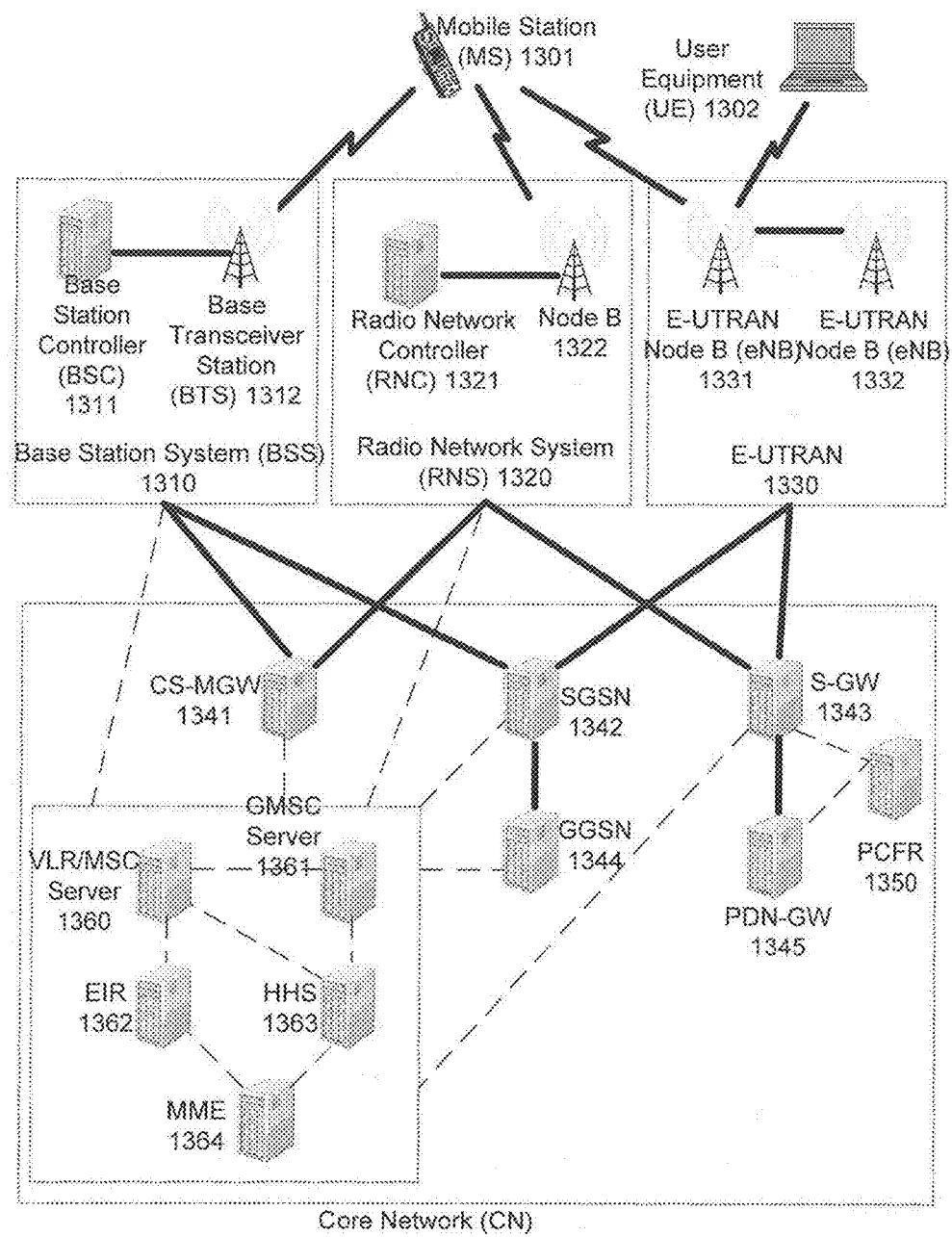
FIG. 13 illustrates a PLMN block diagram view of an exemplary architecture in which one or more disclosed embodiments may be implemented.

FIG. 13 illustrates a PLMN block diagram view of an exemplary architecture in which initiation of a call to an emergency call center may be incorporated. Mobile Station (MS) 1301 is the physical equipment used by the PLMN subscriber. In one illustrative embodiment, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 13 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While example embodiments of systems and methods for application level load balancing have been described in connection with various communications devices and computing devices/processors, the underlying concepts can be applied to any communications or computing device, processor, or system capable of implementing the application level load balancing systems and methods described. The various techniques described herein may be implemented in connection with hardware or software or, where appropriate, with a combination of both. Thus, the methods and apparatuses for application level load balancing, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for application level load balancing. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for application level load balancing may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for application level load balancing. When implemented on a general-purpose processor, the program code combines with the processor to provide a unique apparatus that operates to invoke the functionality of application level load balancing as described herein. Additionally, any storage techniques used in connection with an application level load balancing system may invariably be a combination of hardware and software.

While application level load balancing systems and methods have been described in connection with the various embodiments of the various figures, it is to be understood that other similar embodiments may be used or modifications and additions may be made to the described embodiments for performing the same function of application level load balancing without deviating therefrom. For example, one skilled in the art will recognize application level load balancing as described in the present application may apply to any environment, whether wired or wireless, and may be applied to any number of such devices connected via a communications network and interacting across the network. Therefore, application level load balancing should not be limited to any single embodiment, but rather should be construed in breadth and scope in accordance with the appended claims.

What is claimed is:

1. A method comprising:
connecting a mobile device with at least a first base station via a first communication link and second base station via a second communication link;
receiving, by the mobile device, an application level load balancing factor, the application level load balancing factor based on:
an amount of data traffic historically traversing a first communication link during a first period, the first period on a previous date,
remaining download usage available for the mobile device,
type of service permitted for the mobile device, and
different types of video streaming applications;
providing a rank to each communication link of a plurality of communication links comprising the first communication link and the second communication link for a second period based on the application level load balancing factor, the second period being in the future and corresponding to the first period; and
providing instructions to distribute data packets during the second period based on the ranking of each communication link.

2. The method of claim 1, further comprising transmitting, by the mobile device, video data to a first base station and non-video data to a second base station based on the application level load balancing factor.

3. The method of claim 1, wherein the application level load balancing factor is further based on a combination of at least two of, a traffic status/condition index, a user profile, or a device capability identifier.

4. The method of claim 1, wherein the providing the rank was done by a secondary application level load balancer of the mobile device based on a primary application level load balance of a network device not being available.

5. The method of claim 1, wherein the application level load balancing factor is further based on processor information of a network device.

6. The method of claim 1, wherein the application level load balancing factor is further based on a service permission indicator.

7. The method of claim 1, wherein the application level load balancing factor is further based on a device display resolution.

8. A network device comprising:
a processor; and
a memory coupled with the processor, the memory comprising executable instructions that when executed by the processor cause the processor to effectuate operations comprising:
connecting the network device with at least a first mobile device via a first communication link and a second communication link;
receiving an application level load balancing factor, the application level load balancing factor based on:
an amount of data traffic historically traversing a first communication link during a first period, the first period on a previous date,
remaining download usage available for the mobile device,
type of service permitted for the mobile device, and
different types of video streaming applications;
providing a rank to each communication link of a plurality of communication links comprising the first communication link and the second communication link for a second period based on the application level load balancing factor, the second period being in the future and corresponding to the first period; and
providing instructions to distribute data packets during the second period based on the ranking of each communication link.

9. The network device of claim 8, wherein the application level load balancing factor further based on a device capability identifier.

10. The network device of claim 8, wherein the application level load balancing factor further based on a combination of at least two of, a traffic status/condition index, a user profile, or a device capability identifier.

11. The network device of claim 8, wherein the application level load balancing factor further based on a service permission indicator.

12. The network device of claim 8, wherein the application level load balancing factor further based on error information.

13. The network device of claim 9, wherein the application level load balancing factor further based on a device category.

14. A system comprising:
a wireless transmit/receive unit (WTRU) that sends or receives data packets; and
a network device communicatively connected with the WTRU, the network device comprising:
a processor; and
a memory coupled with the processor, the memory comprising executable instructions that when executed by the processor cause the processor to effectuate operations comprising:
connecting the network device with at least a first mobile device via a first communication link and a second communication link;
receiving an application level load balancing factor, the application level load balancing factor based on:
an amount of data traffic historically traversing a first communication link during a first period, the first period on a previous date,
remaining download usage available for the WTRU,
type of service permitted for the WTRU, and
different types of video streaming applications;
providing a rank to each communication link of a plurality of communication links comprising the first communication link and the second communication link for a second period based on the application level load balancing factor, the second period being in the future and corresponding to the first period; and
providing instructions to distribute data packets during the second period based on the ranking of the communication link.

15. The system of claim 14, wherein the application level load balancing factor further based on a device capability identifier.

16. The system of claim 14, wherein the application level load balancing factor further based on at least two of, a traffic status/condition index, a user profile, or a device capability identifier.

17. The system of claim 14, wherein the providing the rank was done by a secondary application level load balancer of the network device based on a primary application level load balance of a network device not being available.

18. The system of claim 14, wherein the application level load balancing factor based on error information of the WTRU.

19. The system of claim 14, wherein the application level load balancing factor comprises a user profile that comprises at a bandwidth allowance indicator.

20. The system of claim 14, wherein the application level load balancing factor further based on a device display resolution.

* * * * *